United States Patent Office 3,409,583
Patented Nov. 5, 1968

3,409,583
ETHYLENE POLYMERS STABILIZED WITH CARBON BLACK AND ALKYLATED HYDROXY ANISOLES
Jack Russell Davis and Willard Henry Wharton, Lake Jackson, and Michael Calvin McGaugh, Angleton, Tex., assignors to The Dow Chemical Company, Midland, Mich., a corporation of Delaware
No Drawing. Filed Oct. 27, 1965, Ser. No. 505,420
6 Claims. (Cl. 260—41)

ABSTRACT OF THE DISCLOSURE

A polymer composition of increased stability against oxidative degradation comprised of an ethylene polymer and a stabilizing amount of carbon black and an alkylated hydroxy anisole having the formula

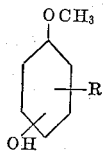

where R is one or more alkyl groups containing one to eight carbon atoms per group.

---

This invention relates to the stabilization of ethylene polymers. More specifically it relates to ethylene polymers stabilized against oxidation.

Ethylene polymers and copolymers are well known to the art and have found broad utility. However, these polymers are subject to oxidative degradation, and in practically all uses for these materials, it is necessary to provide an antioxidant in the polymer composition. Unless antioxidants are provided, the usefulness of these plastics is markedly reduced.

Numerous materials either singly or in combination with others have either been proposed or used for ethylene polymers, and while some of these antioxidants are moderately successful, research is continuing in search of better antioxidants to prevent oxidative degradation of the very useful plastic materials.

In accordance with the present invention it has been found that ethylene polymers can be effectively stabilized aginst oxidative degradation by incorporating in the polymer a small but effective amount of an alkylated hydroxy anisole having the formula

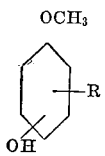

where R represents one or more alkyl groups containing one to eight carbon atoms per group and a small but effective amount of carbon black.

Suitable examples of alkylated hydroxy anisoles useful in the practice of the present invention include, 2-methyl-4-methoxyphenol, 3-methyl-4-methoxyphenol, 2-ethyl-4-methoxyphenol, 3 - ethyl - 4 - methoxyphenol, 2-propyl-4-methoxyphenol, 3 - propyl-4-methoxyphenol, 2-butyl-4-methoxyphenol, 3-butyl-4-methoxyphenol, 2-tert.butyl-4-methoxyphenol, 3-tert.butyl-4-methoxyphenol, 2-octyl-6-methyl - 4 - methoxyphenol and 2-tert.butyl-5-methyl-3-methoxyphenol.

Ordinary carbon blacks including channel blacks, lampblacks and acetylene blacks having particle sizes from about 40 to about 5,000 Angstrom units (A) are suitable for use in this invention and carbon blacks having particle sizes between 40 and 250 A are preferred.

Ethylene polymers which may be stabilized against oxidative degradation according to the present invention include polyethylene of the so-called low, high or intermediate density type, copolymers of a major proportion of ethylene and minor proportions of one or more other α-olefins such as propylene, 1-n-butene, 3-methyl-1-butene, 1-n-pentene, 4-methyl-1-pentene, 1-n-hexene and other ethylenically unsaturated monomers capable of copolymerizing with ethylene. The term "polymers" is used herein to designate both homopolymers and copolymers.

The amount of alkylated hydroxy anisole and carbon black employed in ethylene polymer compositions in accordance with the invention can be widely varied, the stabilizing amounts of the individual stabilizer components usually varying with the particular use to which the ethylene polymer is to be put. Concentrations of carbon black ranging from about one to about five percent by weight (based on the polymer) in combination with about 10 to about 5,000 parts per million (p.p.m.) of the alkylated hydroxy anisole are generally used and concentrations of about two to about three percent by weight of the carbon black and about 100 to about 1,000 p.p.m. of the alkylated hydroxy anisole are preferred.

The stabilizer combination of the invention can be incorporated or blended into ethylene polymer compositions by any of the conventional methods used for blending such materials into resins or plastics. Typical of such methods that can be suitably employed include milling, as on heated rolls, screw extruders, Banbury mixers and the like, deposition from solvents as by spraying or washing and dry blending. The stabilizers of the invention can be incorporated separately or together into the ethylene polymer composition. Ethylene polymers stabilized in accordance with the invention can be cast, extruded, rolled or molded into sheets, rods, tubes, piping, filaments and other shaped articles, including widely used films of the polymer of from about 0.1 to 100 mils in thickness. The present ethylene polymer composition can be used for coating paper, cloth, wire, metal foil, glass fiber fabrics, synthetic and natural textiles and other such materials. Likewise small amounts of other additives such as are commonly added to ethylene polymers for specific uses can be employed. In addition, other stabilizers, inhibitors or the like including plasticizers, lubricants, dyes, pigments, fillers and the like can be employed in the present ethylene polymer compositions, if desired.

The incorporation of both the alkylated hydroxy anisole and the carbon black in the ethylene polymer produces a stabilizing effect that is substantially greater than the additive effect of these compounds individually as will be illustrated in the following example.

Example

Samples of polyethylene having a density of 0.919 gram per cubic centimeter and a melt index of 0.2 were dry blended with varying concentrations of butylated hydroxy anisole (BHA) (a mixture of 2- and 3-tertiary-butyl-4-methoxyphenol) and carbon black having an average particle size of 80 A. The various blends were plasticized and extruded at 350° F. through a 2½ inch Farrell Birmingham extruder into strands, quenched in a water bath at 70° C. and pelletized.

The antioxidant efficiency of the stabilizer combination was determined by measuring the "induction period" of the stabilized polyethylene. The "induction period" was determined in the following manner: A molded 0.2 gram sample (0.020 mil. thick) of the stabilized polyethylene supported by #40 stainless steel screen was placed in an oxygen bomb equipped with a differential volumetric recorder and maintained at 350° F. under an atmosphere of pure oxygen (at an initial pressure of 15 p.s.i.a.). The time vs. oxygen volume curve was then examined and the induction period, i.e. the time at which oxygen volume began to drop, was determined; the loss of gaseous O₂ being due to the absorption (reaction) of O₂ on the polyethylene sample.

For purposes of contrast, polyethylene samples prepared in a manner similar to the above example with the exception that either or both of the stabilizer components were omitted from the polyethylene resin were also evaluated for resistance to oxidation as control samples.

The induction periods of the polyethylene resin stabilized according to the present invention (Sample No. 1) as well as the control samples (Sample Nos. 2, 3 and 4) are recorded in the table below.

TABLE.—COMPOSITION OF POLYETHYLENE RESIN

| Sample No. | Carbon Black (percent by wt.) | BHA (p.p.m.) | Induction period, min. in O₂ at 350° F. |
|---|---|---|---|
| 1 | 2.65 | 130 | 108.0 |
| 2 | | 130 | 36.0 |
| 3 | 2.65 | | 17.2 |
| 4 | | | 2.4 |

It can be seen from the table that unmodified polyethylene (Sample No. 4) starts to react with oxygen after only 2.4 minutes, and the stabilizer combination of the present invention (Sample No. 1) effects a 45 fold increase in the induction period i.e., the time during which there is no appreciable reaction between the polyethylene and oxygen and is substantially greater than expected or predictable aggregative effect of similar concentrations of the individual stabilizer components as illustrated by control Sample Nos. 2 and 3.

In a similar manner a combination of the other mentioned alkylated hydroxy anisoles may be incorporated along with carbon black in polyethylene and copolymers of ethylene and the other mentioned alpha olefins to obtain similar improvement in the resistance of the ethylene polymer to oxidative degradation.

What is claimed is:

1. A polymer composition of increased stability against oxidative degradation comprised of an ethylene polymer and a stabilizing amount of from about 1 to about 5 percent by weight of carbon black and from about 50 to about 5000 parts per million of an alkylated hydroxy anisole having the formula

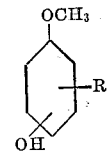

where R is one or more alkyl groups containing one to eight carbon atoms per group.

2. The composition of claim 1 wherein the alkylated hydroxy anisole is a tertiary-butyl-4-methoxyphenol.

3. The composition of claim 1 wherein the ethylene polymer is polyethylene.

4. The composition of claim 1 comprised of polyethylene, from about 100 to about 1,000 parts per million of a tertiary-butyl-4-methoxyphenol and from about two to about three percent by weight carbon black based on the polyethylene.

5. A polymer composition of increased stability against oxidative degradation comprised of polyethylene, from about 2 to 3 percent by weight of carbon black based on the polyethylene and from about 100 to about 1000 parts per million of a mixture of 2-t-butyl-4-methoxyphenol and 3-t-butyl-4-methoxyphenol.

6. The composition of claim 5 wherein carbon black is present in an amount of 2.65 percent by weight based on the polyethylene and the mixture of 2-t-butyl-4-methoxyphenol and 3-t-butyl-4-methoxyphenol is present in an amount of 130 parts per million.

References Cited

UNITED STATES PATENTS

| Re. 23,239 | 6/1950 | Rosenwald et al. | 260—613 |
| 2,512,459 | 6/1950 | Hamilton | 260—41 XR |
| 2,669,507 | 2/1954 | Young | 260—45.95 XR |
| 2,698,463 | 1/1955 | Conwell et al. | 260—45.95 XR |

JULIUS FROME, Primary Examiner.

J. H. DERRINGTON, Assistant Examiner.